United States Patent
Sejalon et al.

(10) Patent No.: US 9,586,525 B2
(45) Date of Patent: Mar. 7, 2017

(54) CAMERA-ASSISTED BLIND SPOT DETECTION

(75) Inventors: Frederic Marcel Sejalon, Commerce Township, MI (US); Gunter Rottner, Wixom, MI (US); Jeffrey Bochenek, Milford, MI (US); Wolfgang Niehsen, Bad Salzdetfurth (DE)

(73) Assignee: Robert Bosch GmbH, Stuttgart (DE)

(*) Notice: Subject to any disclaimer, the term of this patent is extended or adjusted under 35 U.S.C. 154(b) by 998 days.

(21) Appl. No.: 13/304,714

(22) Filed: Nov. 28, 2011

(65) Prior Publication Data

US 2013/0135089 A1     May 30, 2013

(51) Int. Cl.
| | |
|---|---|
| *B60Q 9/00* | (2006.01) |
| *B60R 1/00* | (2006.01) |
| *G08G 1/16* | (2006.01) |
| *B60W 30/18* | (2012.01) |

(52) U.S. Cl.
CPC ............. *B60Q 9/008* (2013.01); *B60R 1/00* (2013.01); *G08G 1/167* (2013.01); *B60R 2300/802* (2013.01); *B60W 30/18163* (2013.01); *B60W 2420/42* (2013.01)

(58) Field of Classification Search
CPC .. G08G 1/167; B60Q 9/008; B60R 2300/802; B60R 1/00; B60W 30/18163; B60W 2420/42
USPC ........................................................ 340/435
See application file for complete search history.

(56) References Cited

U.S. PATENT DOCUMENTS

| | | | |
|---|---|---|---|
| 5,521,579 A | 5/1996 | Bernhard | |
| 6,498,620 B2 | 12/2002 | Schofield et al. | |
| 6,859,148 B2 | 2/2005 | Miller et al. | |
| 2008/0169938 A1* | 7/2008 | Madau | B60R 1/00 340/901 |
| 2009/0045928 A1 | 2/2009 | Rao et al. | |
| 2009/0079828 A1 | 3/2009 | Lee et al. | |
| 2009/0167514 A1 | 7/2009 | Lickfelt | |
| 2010/0073480 A1* | 3/2010 | Hoek et al. | 348/148 |
| 2010/0117813 A1* | 5/2010 | Lee | 340/435 |
| 2011/0251768 A1 | 10/2011 | Luo et al. | |
| 2012/0041632 A1 | 2/2012 | Garcia Bordes | |

FOREIGN PATENT DOCUMENTS

| | | |
|---|---|---|
| DE | 10302052 | 7/2004 |
| DE | 102007039374 | 2/2009 |
| WO | 2010/066394 | 6/2010 |

OTHER PUBLICATIONS

International Search Report and Written Opinion for Application No. PCT/US2012/066595 dated Feb. 21, 2013 (10 pages).

* cited by examiner

*Primary Examiner* — An T Nguyen
(74) *Attorney, Agent, or Firm* — Michael Best & Friedrich LLP

(57) ABSTRACT

A blind spot detection system. The system includes a camera mounted at the rear of a vehicle, a controller coupled to the camera, and an indicator coupled to the controller. The camera is configured to capture images in a field-of-view to the rear of the vehicle. The controller is configured to receive a signal from the camera indicative of the images, and controller determining when a second vehicle in the images enters a blind spot of the vehicle. The controller activates the indicator when the second vehicle enters the blind spot of the vehicle.

8 Claims, 5 Drawing Sheets

CAMERA-ASSISTED BLIND SPOT DETECTION

BACKGROUND

The invention relates to blind spot detection systems for vehicles. More specifically, the invention relates to a blind spot detection system that uses a rear view camera to detect when another vehicle has entered the vehicle's blind spot.

Most blind spot detection systems use dedicated sensors to determine when an object is in a vehicle's blind spot (i.e., an area where a driver of the vehicle cannot see the object with the vehicle's mirrors). For example, dedicated ultrasonic, radar, and similar sensors are fitted on or in vehicles and used for blind spot detection purposes, detect vehicles in the blind spot and alert the driver of the presence of those vehicles.

SUMMARY

The invention performs blind spot detection with sensors that are used for other vehicle functions (e.g., ultrasonic sensors from a parking assist system, a rear-view camera for a backing assist system, etc.).

In one embodiment, the invention provides a blind spot detection system. The system includes a camera mounted at the rear of a vehicle, a controller coupled to the camera, and an indicator coupled to the controller. The camera is configured to capture images in a field-of-view to the rear of the vehicle. The controller is configured to receive a signal from the camera indicative of the images, and controller determining when a second vehicle in the images enters a blind spot of the vehicle. The controller activates the indicator when the second vehicle enters the blind spot of the vehicle.

In another embodiment the invention provides a method of detecting a vehicle in a blind spot of a host vehicle. The method includes providing a plurality of images from a camera to a controller of a field-of-view (FOV) behind the vehicle, detecting, by the controller, a second vehicle in the plurality of images, tracking, by the controller, the second vehicle, determining that the second vehicle has entered one of the vehicle's blind spots, and issuing, by the controller, an indication of the second vehicle's position to an operator of the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
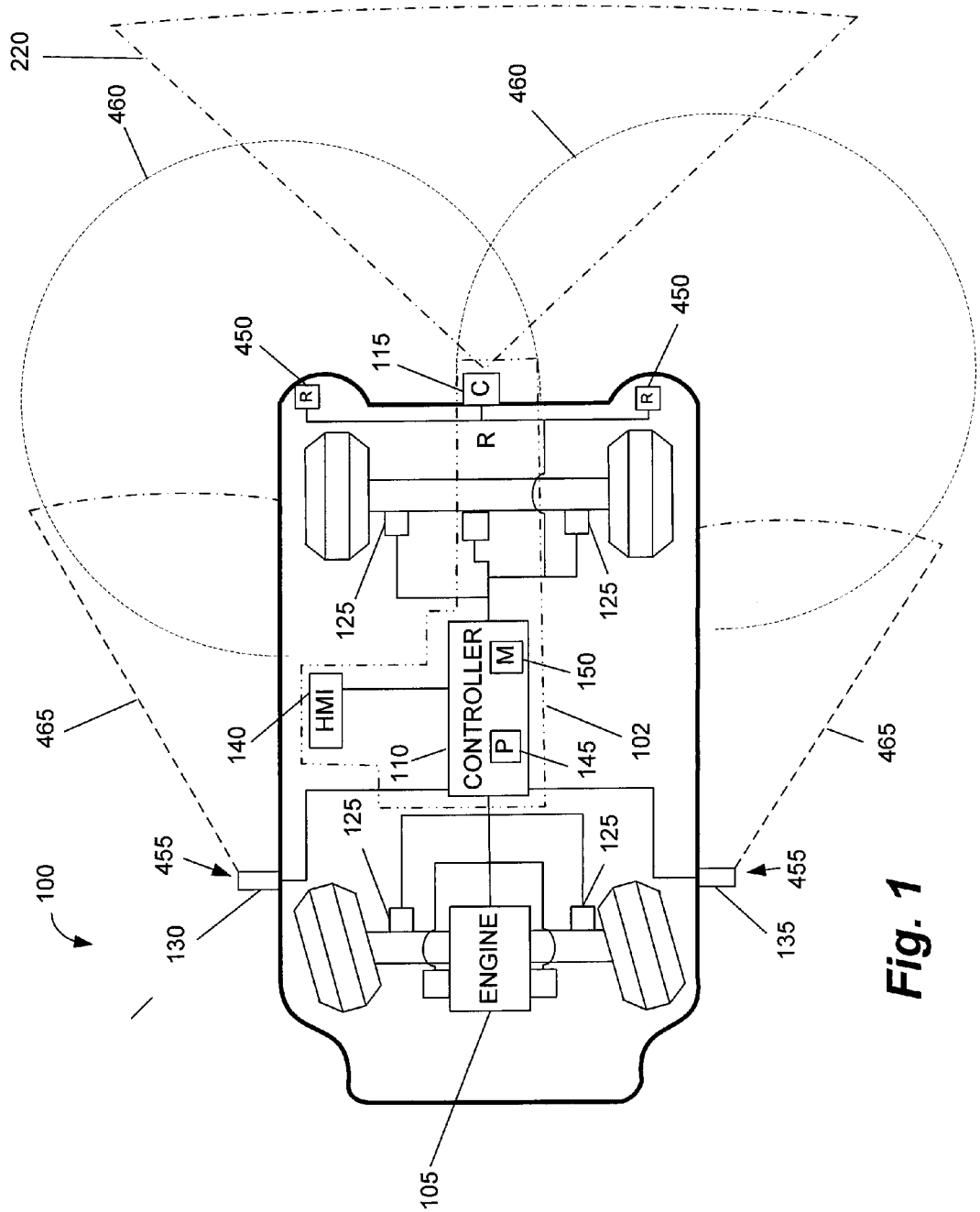
FIG. 1 is a diagram of a vehicle showing fields-of-view for a plurality of sensors.

FIG. 1 shows a vehicle 100 equipped with a blind spot detection system 102. The vehicle 100 includes an engine 105, a controller 110, a rear-view camera 115 (e.g., a CCD camera), a plurality of wheel speed sensors 125, a right side-view mirror 130, a left side-view mirror 135, and a human-machine interface (HMI) 140. The controller 110 can be a stand-alone controller (i.e., performing driver information functions) or can incorporate other control functions (e.g., engine control, braking control, etc.) in addition to driver information functions. The blind spot detection system 102 includes the controller 110, the rear-view camera 115, and the HMI 140. In some embodiments, as described below, the blind spot detection system 102 includes additional components (e.g., additional sensors, additional HMI devices).

The controller 110 includes a processor 145 (e.g., a microprocessor, microcontroller, ASIC, DSP, FPGA, etc.) and memory 150 (e.g., flash, ROM, RAM, EEPROM, etc.), which can be internal to the processor 145, external to the processor 145, or a combination thereof. The controller 110 also includes other circuits such as input/output circuits and communication circuits (not shown). The controller 110 can store in the memory 150 information on objects detected in a video signal or data from the camera 115, and track the movement of the objects over time.

Figure 2B:
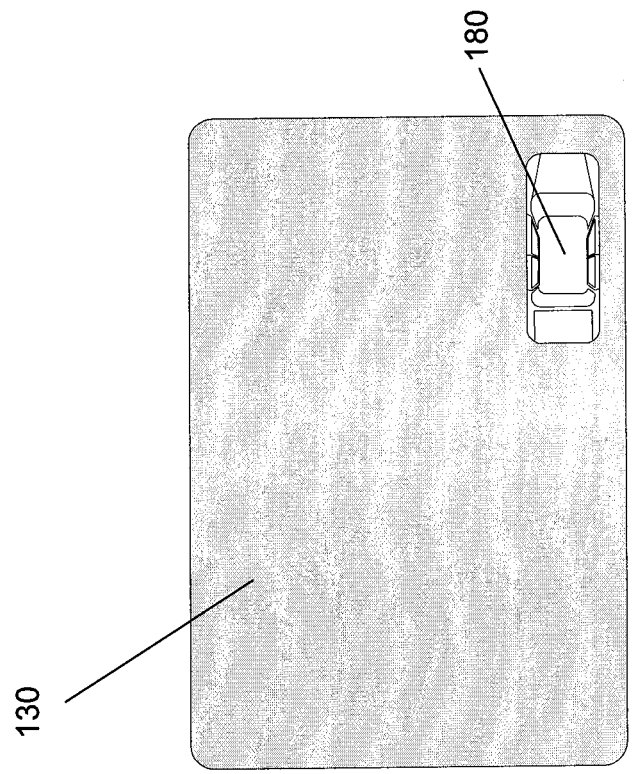
FIG. 2B shows the side view mirror of FIG. 2A with a blind spot indicator icon lit.
Figure 2A:
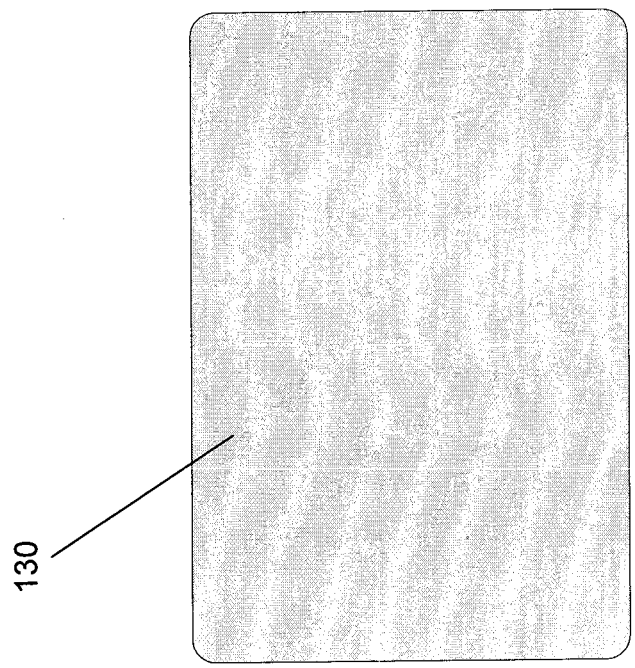
FIG. 2A shows a side view mirror.

The HMI 140 provides an interface between the system and a driver. The HMI 140 provides one or more suitable input methods such as buttons, a touch-screen display having menu options, voice recognition, etc. for turning on/off functions (not shown). The HMI 140 also provides warnings or indications to the driver of other vehicles that may pose a potential risk. The HMI 140 provides the warning using a suitable indicator such as a tell-tale light on an instrument cluster, a warning icon on a mirror, a heads-up display, etc., an acoustic alarm such as a chime or buzzer, and/or a haptic indicator (e.g., vibrating the steering wheel). The system can provide different warnings based on a level of the potential risk. For example, the system can flash an icon when a vehicle is approaching the host vehicle's blind spot, and can light continuously when the vehicle is in the host vehicle's blind spot. FIGS. 2A and 2B illustrate an exemplary side view mirror blind spot indicator. FIG. 2A shows the mirror 130 when a vehicle is not in the blind spot. The entire area of the mirror 130 is reflective allowing a driver to see to the side and behind the vehicle 100. When another vehicle is detected in the blind spot, an icon 180 is lit in a corner of the mirror 130.

Figure 3:
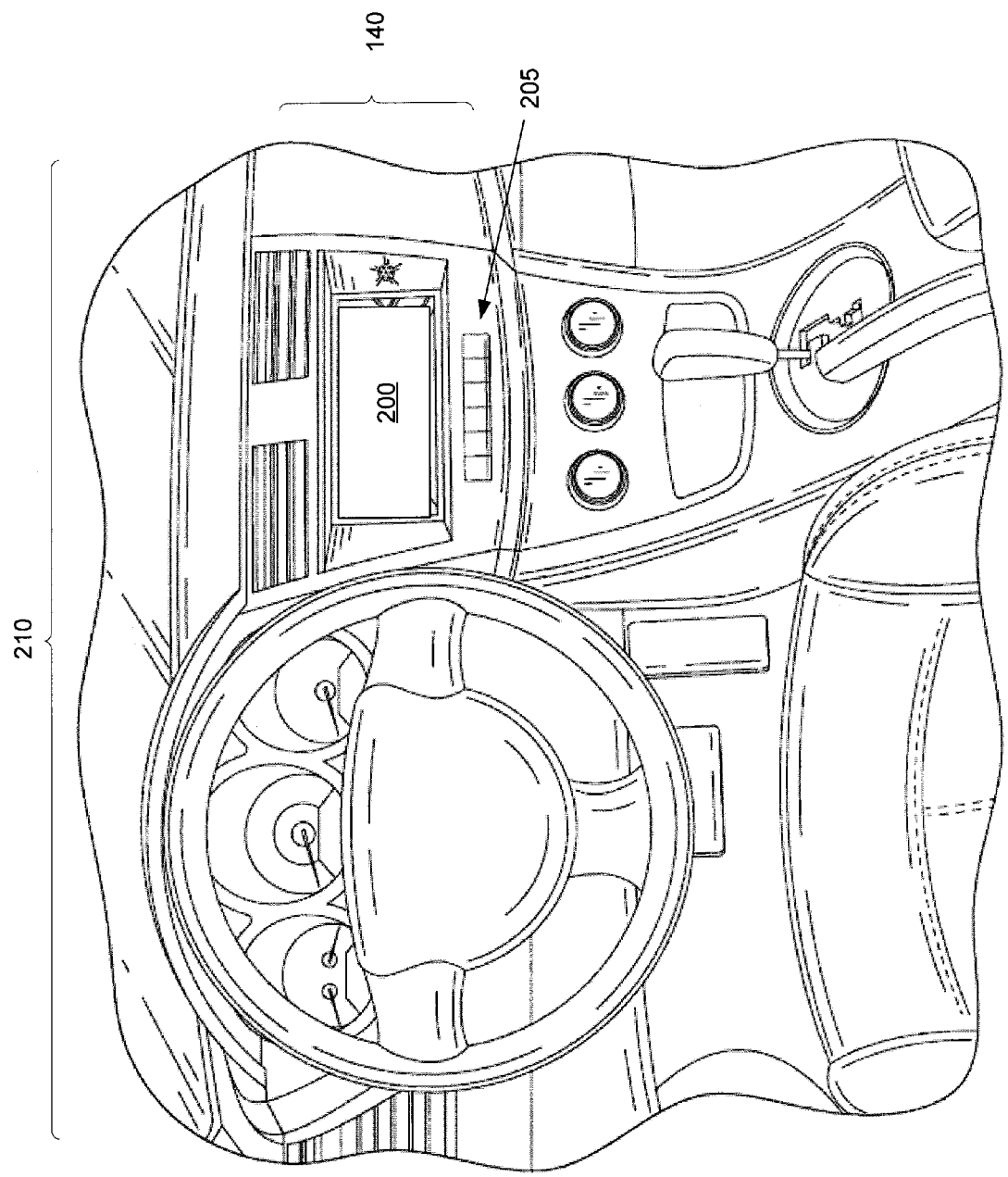
FIG. 3 is a plan view of a dashboard of a vehicle.

FIG. 3 shows a construction of another portion of the HMI 140. The portion includes a display 200 (e.g., an LCD display) and a plurality of buttons 205 positioned in a dashboard 210 of the host vehicle 100. In some constructions, the display 200 includes a touch-screen enabling an operator to provide input to the system via the display 200.

The camera 115 is mounted on a rear R of the vehicle 100, and has a field-of-view (FOV) 220 extending rearward from the vehicle 100. The FOV 220 is the area in which the camera 115 is able to detect light reflected off of objects. The camera 115 converts the reflected light into a video signal. The size (e.g., viewable angle) of the FOV 220 is dependent on the construction of the camera 115, such as the camera's focal length.

When the host vehicle 100 is backing up (i.e., the transmission is in reverse), the HMI 140 receives the video signal and displays an image which is indicative of a view of the area in the FOV 220. The displayed image assists the driver in backing up the vehicle by showing objects that are behind the host vehicle 100. In some embodiments, the video signal is fed directly to the HMI 140, and the controller 110 controls when the HMI 140 displays the video image (e.g., when the host vehicle 100 is backing up). In other embodiments, the video signal is fed to the controller 110, and the controller 110 feeds the video signal to the HMI 110 when appropriate (e.g., when the host vehicle 100 is backing up).

When the host vehicle 100 is not backing up, the HMI 140 does not display the video image. However, the camera 115 still picks up images in the FOV 220, and produces the video signal. The controller 110 uses the video signal to determine when another vehicle enters one of the host vehicle's blind spots, and issues an alarm (e.g., lights an icon 180 in a side view mirror 130 or 135) to warn the driver of the vehicle in the blind spot.

Figure 4:
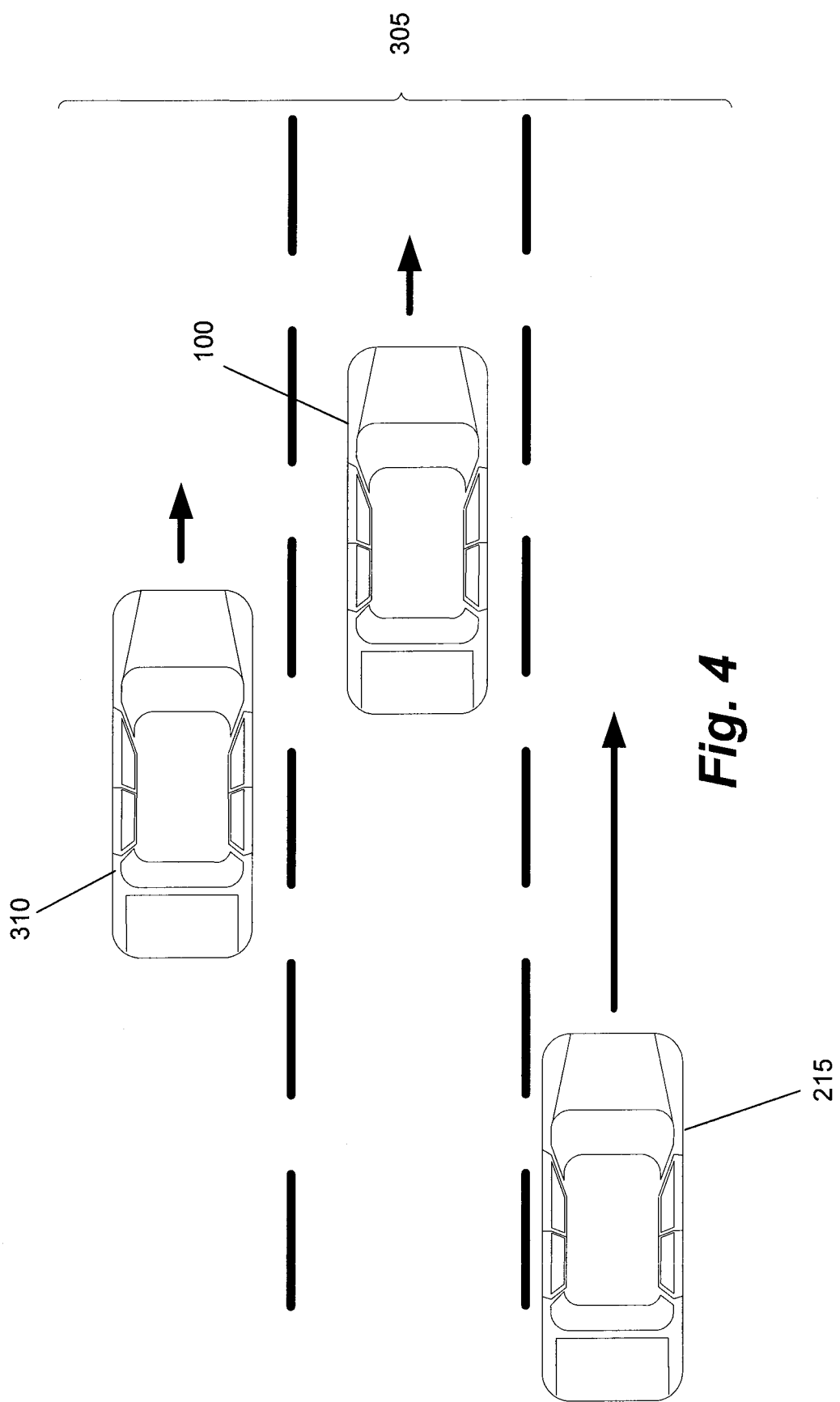
FIG. 4 shows positions of vehicles detected by a blind spot detection system.

FIG. 4 depicts vehicles near the vehicle 100 which may be detected by the blind spot detection system 102. The host vehicle 100 is traveling down a three-lane highway 305. A second vehicle 310 is in the driver's blind spot where the driver may not be able to see the second vehicle 310 (e.g., via a mirror or the driver's peripheral vision). The second vehicle 310 is depicted traveling a distance behind host vehicle 100. The controller 110 detects the second vehicle 310 and determines whether the second vehicle 310 is in the host vehicle's blind spot as described in greater detail below. The controller 110 makes this determination based on the distance the second vehicle 310 is from the host vehicle 100, and how fast the vehicle 310 is moving relative to the host vehicle 300.

Figure 5:
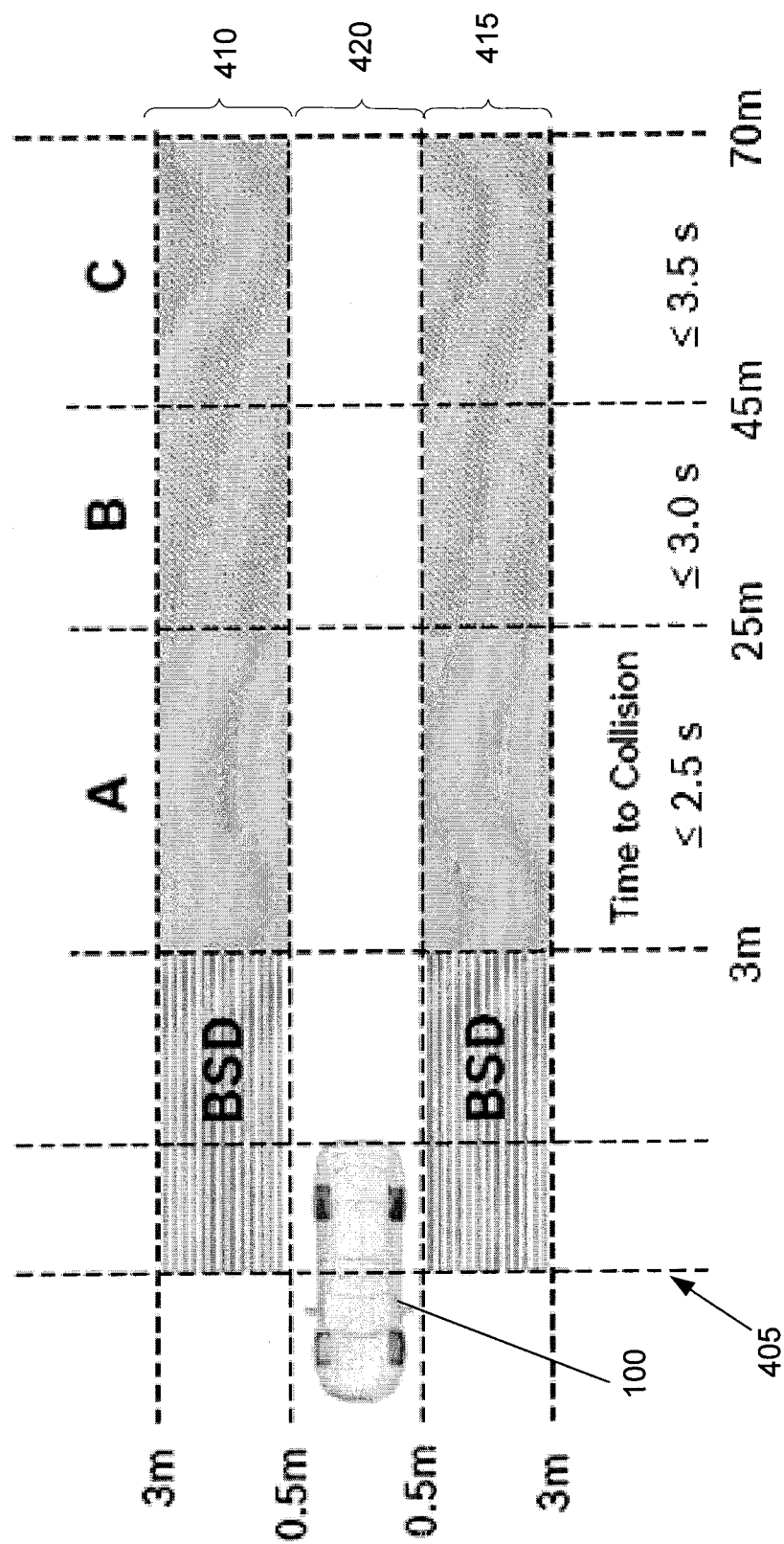
FIG. 5 illustrates exemplary zones of danger for a blind spot detection system.

FIG. 5 illustrates exemplary zones of danger and operating parameters for the blind spot detection system 102. The blind spot detection system provides a warning to the driver whenever an object (e.g., a vehicle) is adjacent the host vehicle 100 (e.g., within an area bounded by a middle 405 of the host vehicle 100 to about 3 meters behind the host vehicle 100 and from about 0.5 meters to the left and right of the host vehicle 100 to about 3 meters left and right, respectively, of the host vehicle 100).

In one embodiment, the blind spot detection system is implemented using three different zones of danger A, B, and C, respectively, as shown in FIG. 4. In addition to the zones of danger, there is a blind spot detection (BSD) area. Each zone (A, B and C) covers a different area in a lane 410 and a lane 415 adjacent to a lane 420 that host vehicle 100 is presently in. Specifically, the area covered by zone A extends from about 3 meters to about 25 meters behind the host vehicle 100, the area covered by zone B extends from about 3 meters to about 45 meters behind the host vehicle 100, and the area covered by zone C extends from about 3 meters to about 70 meters behind the host vehicle 100.

All zones A, B (which includes zone A), and C (which includes zones A and B) are bounded by an area about 0.5 meters from the side of the host vehicle 100 to about 3 meters from the side of the host vehicle 100. By tracking vehicles detected in the zones, the controller 110 can estimate if and when a vehicle will be in the host vehicle's blind spot. Each zone has a different time-to-blind-spot threshold.

The controller 110 detects vehicles in the FOV 220 of the camera 115, and determines when the vehicle enters the blind spot. The controller 110 can detect the wheels of the vehicle during daylight hours and can detect headlights of the vehicle during darkness. The controller 110 then determines a position of the vehicle relative to the host vehicle 100 as well as a closing rate. U.S. patent application Ser. No. 12/758,394 entitled "Video Based Intelligent Vehicle Control System" filed Apr. 12, 2010, the entire content of which is incorporated by reference, describes systems and methods for detecting objects using images obtained from a camera, and determining their positions relative to a host vehicle including how those positions are changing (e.g., a closing rate).

Referring back to FIG. 1, the host vehicle 100 can also include additional sensors such as rear, cross-traffic alert object detection devices 450 and/or blind spot object detection devices 455 (e.g., embedded in the side view mirrors 130 and 135). The rear, cross-traffic alert object detection devices 450 are positioned on the right and left rear sides of the host vehicle 100 and have a FOV 460. As described in U.S. patent application Ser. No. 12/855,238 entitled "Combined Lane Change Assist and Rear, Cross-Traffic Alert Functionality" filed Aug. 12, 2010, the entire content of which is hereby incorporated by reference, the controller 110 receives indications from the rear, cross-traffic alert object detection devices 450 when objects are in their FOV 460 and warns the driver if another vehicle is approaching the host vehicle 100 when the host vehicle 100 is backing up. The rear, cross-traffic alert object detection devices 450 can be radars (e.g., 24 GHz or 77 GHz mid-range radar sensors), light detecting and ranging (LIDAR) sensors, video cameras, etc. The blind spot object detection devices 455 in the side view mirrors are similar devices to the rear, cross-traffic alert object detection devices 450, and have a FOV 465.

The object detection devices 450 and 455 detect objects that are within their FOVs 460 and 465. The object detection devices 450 and 455 can detect where an object is within the FOV 460 or 465 (e.g., using a time-of-flight method), and how fast and in what direction the object is moving, and an acceleration of the object (e.g., using Doppler effects). In some embodiments, the object detection devices 450 and 455 communicate the location and motion (e.g., speed, acceleration, and direction) information of objects they detect to the controller 110. In other embodiments, the object detection devices 450 and 455 communicate raw data (e.g., transmitted and received frequencies, time-of-flight, etc.) to the controller 110 and the controller 110 determines one or more of the location, speed, acceleration, and direction of detected objects. In some embodiments, the controller 110 merges the data from the object detection devices 450 and 455 together. In other embodiments, one of the object detection devices 450 and 455 merges the data together and communicates the merged data to the controller 110.

In some embodiments, the controller 110 uses information from the camera 115 and one or more object detection devices 450/455 to determine when a vehicle is in the host vehicle's blind spot. For example, the controller 110 can detect a vehicle approaching the host vehicle 100 from the rear using the camera's video image and extrapolate when the vehicle will be in the blind spot. When the vehicle eventually leaves the FOV 220 of the camera 115, the controller 110, based on the extrapolation, "guesses" when the vehicle is in the blind spot, and when the vehicle will have moved out of the blind spot. However, in a host vehicle 100 with one or more object detection devices 450/455, the controller 110 can use information obtained from these devices 450/455 to monitor the vehicle while it is in the blind spot. An alarm provided to the driver is thus based on information from the camera 115 and the object detection devices 450/455. A "preliminary" alarm (e.g., a flashing icon on a side-view mirror) can be provided as a vehicle is approaching the blind spot (e.g., based on the video image from the camera 115), but has not yet entered the blind spot (e.g., is determined to be in zone A). Another alarm (e.g., a solid icon on a side-view mirror) can be provided when the vehicle is in the blind spot (e.g., as detected by an object detection device 450/455 and/or based on extrapolation of the vehicle's position from the video image).

In a situation where the host vehicle 100 is overtaking another vehicle, the object detection devices 450/455 can detect the vehicle when it enters the blind spot and trigger an alarm. Once the vehicle is behind the host vehicle 100, the vehicle will be in the camera's FOV 220, and the controller 110 turns off the alarm. In some embodiments, the controller 110 provides the preliminary alarm until the vehicle is a predetermined distance behind the host vehicle 100 (e.g., moves from zone A to zone B).

By using both the indications received from the object detection devices 450/455 and the video signal from the camera 115, the controller 110 can make more accurate decisions as to the presence of a vehicle in the blind spot. The use of components (e.g., the camera 115 and the object detection devices 450) already on the host vehicle 100 (i.e., for use with other functions such as back up assist and rear, cross-traffic alert) results in reduced cost of implementing a blind spot detection system.

Various features and advantages of the invention are set forth in the following claims.

What is claimed is:

1. A method of detecting a vehicle in a blind spot of a host vehicle, the method comprising:
   providing a plurality of images from a camera to a controller of a field-of-view (FOV) behind the host vehicle;
   detecting, by the controller, a second vehicle in the plurality of images;
   tracking, by the controller, the second vehicle;
   detecting by a sensor configured to detect an object adjacent the host vehicle, that the second vehicle is in the blind spot, the controller configured to receive a signal from the sensor indicative of the presence of the object adjacent the host vehicle;
   determining that the second vehicle has entered one of the host vehicle's blind spots based on the plurality of images from the camera and the signal from the sensor; and
   issuing, by the controller, an indication of the second vehicle's position to an operator of the host vehicle.

2. The method of claim 1, wherein the sensor is positioned on a rear side of the host vehicle.

3. The method of claim 1, wherein the sensor is positioned on a side-view mirror of the host vehicle.

4. The method of claim 1, wherein the sensor is a second camera.

5. The method of claim 1, wherein the sensor is a radar.

6. The method of claim 1, further comprising displaying the plurality of images on a display when the host vehicle is backing up.

7. The method of claim 1, further comprising determining, by the controller, whether the second vehicle is approaching the host vehicle or moving away from the host vehicle, and determining a speed at which the second vehicle is moving toward/away from the host vehicle.

8. The method of claim 1, wherein the controller determines that the second vehicle is in the blind spot when the second vehicle leaves the field of view of the camera.

* * * * *